United States Patent [19]
Wohld
[11] Patent Number: 5,033,012
[45] Date of Patent: Jul. 16, 1991

[54] MOTOR-OPERATED VALVE EVALUATION UNIT

[76] Inventor: Peter R. Wohld, 2 S. 580 Ashley Dr., Glen Ellyn, Ill. 60137

[21] Appl. No.: 314,477
[22] Filed: Feb. 22, 1989
[51] Int. Cl.[5] ........ G06F 15/46; G01M 19/00
[52] U.S. Cl. ........ 364/551.01; 364/569; 364/510; 73/1 C
[58] Field of Search ........ 364/550, 551.01, 505-510, 364/569; 73/168, 1 R, 1 B, 1 C; 324/423; 340/644, 686, 526

[56] References Cited

U.S. PATENT DOCUMENTS

| | | | |
|---|---|---|---|
| 4,451,896 | 5/1984 | Pomerleau et al. | 364/569 |
| 4,563,746 | 1/1986 | Yoshida et al. | 364/551.01 |
| 4,584,654 | 4/1986 | Crane | 364/551.01 |
| 4,613,951 | 9/1986 | Chu | 364/569 |
| 4,637,733 | 1/1987 | Charles et al. | 364/569 |
| 4,694,390 | 9/1987 | Lee | 364/510 |
| 4,707,796 | 11/1987 | Calabro et al. | 364/551.01 |
| 4,719,587 | 1/1988 | Berte | 364/551.01 |
| 4,879,901 | 11/1989 | Leon | 364/508 |

OTHER PUBLICATIONS

Radio Shack, Engineer's Notebook II, 1982, F. M. Mims, p. 126.

*Primary Examiner*—Kevin J. Teska
*Attorney, Agent, or Firm*—John H. Shurtleff; James A. Sprowl

[57] ABSTRACT

An evaluation unit accurately measures the elapsed time between two events. The two events mark the start and stop points of a switching device, such as a motor-operated valve, as it is switching between a first state and a second state. This elapsed time, when compared to a base-line elapsed time or a previously measured elapsed time, provides an indication as to whether the performance of the device has degraded to the point where maintenance or replacement of the switching devices required. The unit includes electro-optical means for individually sensing the occurrence of each event, logic means for selecting the occurrence of either event as the starting or stopping point for the time measurement, and a timing circuit for performing and displaying the time measurement. In one embodiment, the unit includes a microprocessor that processes and stores the time measurements for subsequent retrievel by an external central processor, which processor is programmed to analyze the timing data and generate reports that specify performance criteria associated with the switching device under evaluation.

22 Claims, 7 Drawing Sheets

MOTOR-OPERATED VALVE EVALUATION UNIT

The present invention relates to apparatus and methods for testing a switching device, such as a motor-operated valve. More particularly, the present invention relates to apparatus and methods for evaluating the operability of switching devices used in a critical environment, such as a nuclear power station, and for predicting when such devices need to be maintained or replaced prior to failure.

BACKGROUND OF THE INVENTION

Large industrial facilities, such as nuclear power stations, petroleum refineries, and chemical process plants, use large numbers of motor-operated valves, or similar switching devices, such as solenoid valves or air-operated valves, for process control. All of these switching devices require periodic maintenance to assure their continued operability and to enable the economic and safe operation of the facility. Unfortunately, maintenance expenses at such facilities are high, due in large part to both direct costs and the costs of lost production when equipment must be removed from service to perform the maintenance. Because of these high maintenance expenses, there is a great need in the art for low cost testing and evaluation techniques to accurately assess the current operating condition of such switching devices, and to further reliably predict when such devices need to receive maintenance.

A number of test techniques exist in the art for testing a motor-operated valve, each having its own advantages and disadvantages These techniques include: manually measuring the time required for the valve to move from one state to another (referred to as "valve stroke timing"), monitoring motor current and power, and determining the valve operator thrust (the amount of force or torque delivered by the motor or other device used to operate the valve) during valve stroking. Probably the most reliable and repeatable test technique available for evaluating the operability of a motor-operated valve is to determine the valve operator thrust, as data obtained from such a test will not change significantly unless some problem has developed or is beginning to develop. Data analysis techniques, known in the art, may then be used to monitor the data obtained from such operator thrust tests to predict when such a valve needs maintenance and to prevent a breakdown condition from developing. Unfortunately, this is the most expensive and difficult test to perform because it requires physical access to the equipment, in this case a valve, and intrusion into or removal of the equipment to couple the measuring equipment, thereby requiring that the facility wherein the equipment is located be shut down. Hence, this technique is not preferred unless the facility is shut down for other reasons.

The current preferred motor-operated valve test requirement for nuclear power plants, valve stroke timing, is set forth in the 1986 edition of the American Society of Mechanical Engineers' Boiler and Pressure Vessel Code (ASME Code), Section XI, Subsection IWV. This timing test is carried out manually, using a stopwatch in the central control room, while observing valve position indicator lights. This test offers the advantage of being simple to perform, does not require attendance at the site of the equipment, and does not require any intrusion into the equipment. Unfortunately, this is the least reliable test to perform, not only because of the human element involved in manually operating a stopwatch but also because the evaluations specified by the ASME Code are not specific to individual motor-operator capabilities, which capabilities vary significantly. The human element can seriously affect the accuracy and repeatability of the data, thereby rendering the data obtained of little use for data and statistical analysis purposes. What is needed in the art is an improved motor-operated valve testing technique that offers the reliability and repeatability features of the valve operator thrust tests, while at the same time offers the non-invasive and simplicity advantages of the stroke timing test. The present invention is advantageously directed to such a testing technique.

SUMMARY OF THE INVENTION

The present invention is directed to apparatus and methods for testing and evaluating the performance of a switching device. Briefly stated, the apparatus of the invention uses specialized electronic and/or electro-optical equipment to measure accurately the time it takes a switching device to switch from one state to another. For a motor-operated valve, this time is the stroke time, and this time is electronically measured by electro-optically detecting changes in the valve position indicating lights, and using such detected changes to start and stop an electronic timer. Advantageously, such time measurement is not subject to the inconsistencies and variations of human performance and error and provides meaningful, repeatable data that can be used to better assess and predict the operability of the motor-operated valve. Moreover, the apparatus is preferably housed in a small, battery-powered unit that can be optically coupled to the existing valve position indicating lights at the control station in a simple manner. The motor-operated valve is then tested by simply stroking it, and recording the stroke time that is measured. One embodiment of the apparatus includes a dedicated microprocessor programmed to measure the elapsed time between the changes of the position-indicating lights and includes memory means coupled to the microprocessor for storing the timing measurements. Such embodiment further includes means for linking the microprocessor with an external CPU, so that the data analysis associated with the method of the present invention, described below may be carried out directly from data transferred to the CPU from the microprocessor.

The method of the present invention analyzes and evaluates the timing data obtained using the apparatus of the invention, or equivalent timing devices, to detect and assess any changes in such data taken over several stroke cycles or overtime. For a motor-operated valve, any changes in the timing data are related to changes in motor speed and then compared to the motor "Revolutions Per Minute (RPM) vs. Motor Torque" curve for that particular motor. Small speed decreases are evaluated for possible motor degradation, increased mechanical loads from the operator or valve, or loss of equipment operating margin. From such analysis, an assessment for maintenance needs and an operability evaluation may be performed.

For example, a significant increase in the measured stroke time of a particular motor-operated valve, as compared to a baseline (reference) stroke time or a prior stroke time measurement, may be used to signal a potential problem with the valve. Moreover, an analysis of such data, even if a significant change is not present, may nonetheless indicate a trend that, if continued, could lead to a potential problem in the near future, or at least provide a projection of when maintenance may be needed in the future. Hence, the method of the present invention advantageously provides a technique for predicting the future operability of the motor-operated valve (or other switching device).

As indicated, any switching device that assumes a first or a second state as controlled by an operator (e.g., a motor, solenoid, pump, etc.) and that includes first and second indicator means, such as indicator lights, that indicate the status of the switching device as it switches from one state to the other, may be tested and evaluated by the present invention. In general, for the present invention to be used, each of the first and second indicator means of the switching device should provide a respective status signal that changes condition, such as from OFF to ON or from ON to OFF, as the switching device switches state. Furthermore, either one of the first or second indicator means should change its condition as the switching device begins its change of state, and the other of the first or second indicator means should change its condition as the switching device concludes its change of state.

For a switching device as described above, one embodiment of the present invention may be characterized as including: (1) sensing means for sensing any change in condition of either of the indicator means; (2) logic means coupled to the sensing means for generating a first trigger signal coincident with a change in condition of either of said indicator means, and a second trigger signal coincident with a change in condition of the other of said indicator means, whereby the first trigger signal is generated as the switching device begins its change of state, and the second trigger signal is generated as the switching device ends its change of state; and (3) timing means coupled to the logic means for measuring and displaying the time period between the first trigger signal and the second trigger signal, this measured time period representing the time duration required for the switching device to change states, and this measured time period also providing an indication of the operability of the switching device.

Another embodiment of the present invention may be characterized as an apparatus for measuring the time duration of a transient event, where the end points of the transient event are marked by a change in state of two indicator lights, or equivalent indicators, either one of the two indicator lights changing state at the start of the transient event, and the other of the two indicator lights changing state at the conclusion of the transient event. In accordance with this embodiment, the invention includes: (1) sensing means for sensing any change in state of either of the indicator lights; (2) logic means coupled to the sensing means for generating a first trigger signal coincident with a change in state of either of the indicator lights, and a second trigger signal coincident with a change in state of the other of the indicator lights, whereby the first and second trigger signals are generated coincident with the start and conclusion of the transient event; and (3) timing means coupled to the logic means for measuring the time period between the first trigger signal and the second trigger signal, this time period comprising the time duration of the transient event.

Further, as indicated, the present invention includes a method of evaluating the performance of a switching device, where the switching device assumes a first or a second state as controlled by an operator, this method comprising the steps of: (a) electronically measuring the time period required for the switching device to switch from one state to the other; (b) storing the time period thus measured in a memory device; (c) repeating these steps whenever it is desired to evaluate the performance of the switching device;(d) comparing the most recent time period measured with at least one previous time period stored in the memory device, or otherwise made available for comparison purposes, and (e) identifying any significant changes in the most recent time period based on the comparison made as an indication that the performance of the switching device is degrading, and that said switching device may require maintenance or replacement. In accordance with this method, the previous time period used as a comparison with the most recent measured time period may be a baseline or reference or anticipated time period for a properly operating switching device.

It is a feature of the present invention to provide an apparatus that accurately measures the stroke time of a motor-operated valve in an easy-to-perform, non-invasive manner. Such a feature advantageously allows all valves, and similar devices, in a large complex facility to be tested with minimal impact on the facility.

It is a further feature of the invention to provide such an apparatus wherein the existing valve position indicator lights of a motor-operated valve, or equivalent position indicators, may be used to electro-optically trigger the timing measurement. This feature allows the testing of all the valves associated with a complex facility to be performed from a central control location, such as the central control room where the position indicator lights are located.

Yet another feature of the invention is to provide such a testing apparatus in a small, battery-powered package that can be readily coupled to the existing valve position indicator lights using optical coupling techniques without any direct electrical connection between the valve operator control circuits and the testing apparatus. Such a feature advantageously allows the present invention to quickly and safely perform testing and evaluation.

A still further feature of the invention provides a method for evaluating the stroke time measurement data obtained from a given motor-operated valve to identify potential problems with the performance of such valve and/or to predict operability problems that may arise with such valve in the future. This feature advantageously allows any complex processing facility, such as a nuclear power plant, to have advanced notice relative to any maintenance needs prior to equipment failure that could arise in the future, thereby reducing maintenance costs by avoiding unnecessary maintenance, while at the same time addressing the overall safety concerns associated with operation of such a facility.

BRIEF DESCRIPTION OF THE DRAWINGS

The above and other features and advantages of the present invention will be more apparent from the following more particular description thereof, presented in conjunction with the following drawings wherein.

DETAILED DESCRIPTION OF THE INVENTION

The following is a description of the best presently contemplated mode of carrying out the invention. This description is not to be taken in a limiting sense, but is presented for the purpose of describing the general principles of the invention. The scope of the invention should be determined with reference to the appended claims.

Figure 1:
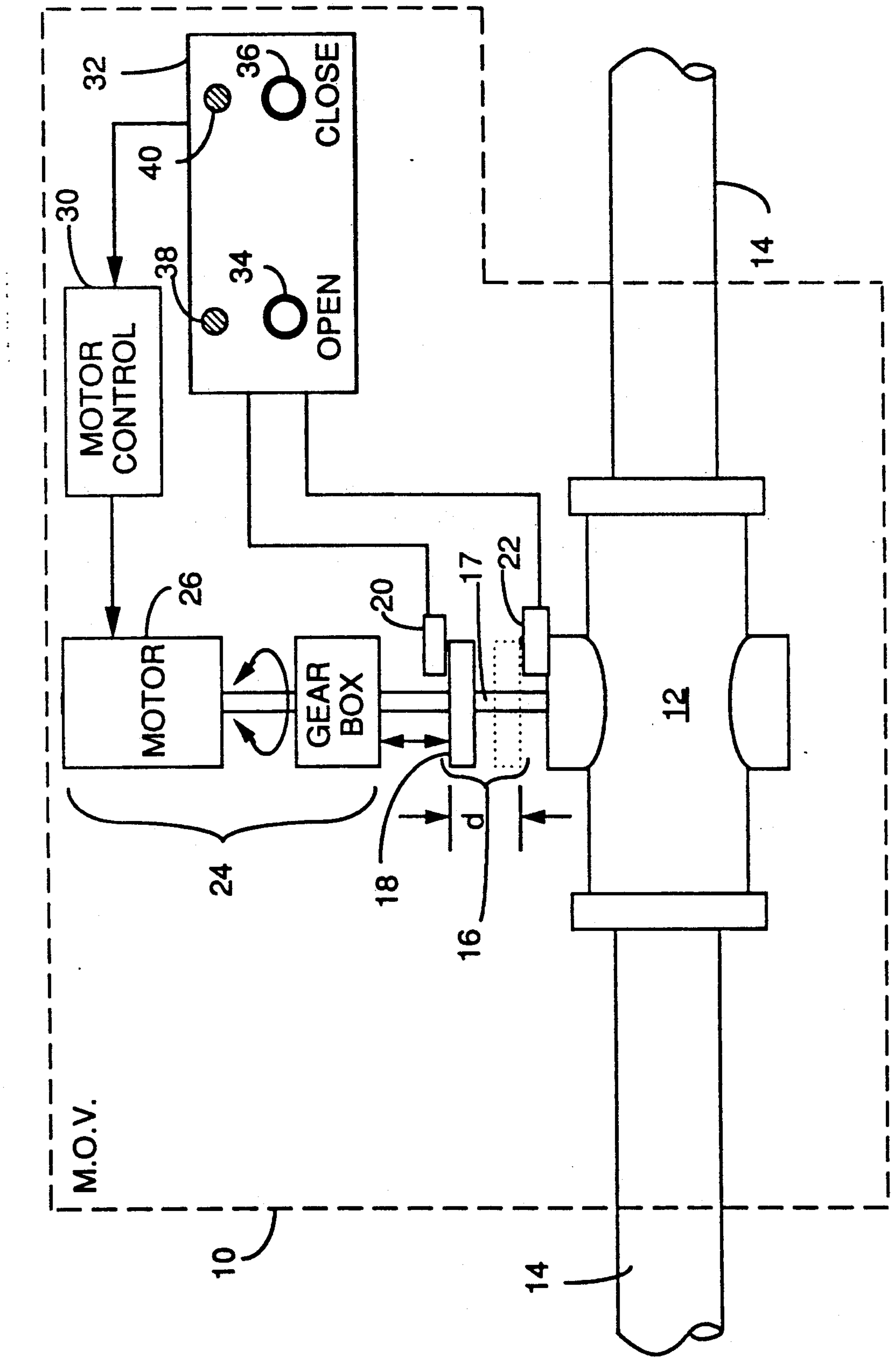
FIG. 1 is a schematic representation of a motor-operated valve (MOV)

To better understand and appreciate the present invention, it will first be helpful to have an understanding of the components and operation of a motor-operated valve of the type with which the present invention is used. Accordingly, reference is first made to FIG. 1, where a simplified schematic diagram of a motor-operated valve 10 is shown. The valve includes a valve section 12, designed to be connected in-line with one or more pipes 14 which form part of the process equipment used in a particular process facility. The valve section 12 includes a suitable mechanism 16 for physically closing or opening the valve 12. In FIG. 1, this mechanism 16 is depicted as a valve stem 17 that moves in and out of the valve 12. This depiction is used for simplicity, but it is to be understood that other types of actuating mechanisms 16 are also known and used within a motor-operated valve.

As the mechanism 16 moves in and out of the valve 12, to physically close or open the valve, it travels a linear distance "d". This distance "d" is defined as the stroke distance of the valve. A microswitch 20 senses when the valve mechanism 16 is in its full open position. Similarly, a microswitch, termed a geared unit switch 22, senses when the valve mechanism 16 is in its full closed position. The valve mechanism is driven by an operator 24 that typically includes a motor 26 and a suitable gear box (or gearing network) 28. The motor 26 may be either an AC or a DC motor. This motor, in turn, is powered and controlled from a motor control circuit 30, which motor control circuit is activated by suitable switches, such as push buttons 38 and 40, located on a control panel 32. The control panel 32 may be located some distance from the motor operated valve 10. Usually, the control panel 32 is located in a central control room.

The control panel 32 includes an indicator light 34, coupled to the geared unit switch, that is wired to indicate when the microswitch 20 is activated, which activation occurs only when the valve 12 opens. Similarly, another indicator light 36, coupled to the geared unit switch 22, is wired to indicate when the valve mechanism 16 is in its full closed position. For simple motor-operated valves 10, it is noted that the motor control circuit 30 may simply be a relay that switches power to the motor 26 to cause it to drive the valve mechanism 16 in a desired direction until the appropriate microswitch is activated, which activation is used to signal that the end position of the valve 12 has been reached, and that power to the motor 26 should be turned off by the motor control circuit 30. More complex motor-operated valves 10 use much more sophisticated control techniques. For purposes of the present invention, however, the only detail of importance is to recognize the manner in which the indicator lights 34 and 36 signal that the valve mechanism 16 has reached one or the other of its open or closed positions. It is the time required for the valve mechanism 16 to travel from one of its extreme positions to the other, i.e., to travel the distance "d", that comprises the "stroke time" measured by the present invention. In some cases, the limit switch may be set slightly prior to the end of travel. However, as long as the stem travel distance between the light actuations remains constant, the timing data will provide meaningful information.

It is further noted that the indicator lights 34 and 36 may assume a variety of sequences and patterns to indicate the various positions of the valve mechanism 16 depending upon the particular type or model of motor-operated valve that is used. However, one light and only one light will be ON, and the other OFF, at the end points of the stroke position because only one microswitch 20 or 22 is activated at a given end position, and the other microswitch 20 or 22 is not. Generally, the open light 34 will be ON and the closed light 36 will be OFF to signal an open condition, and the open light 34 will be OFF and the closed light 36 ON to signal a closed condition. At least one of the lights will always change state (go from OFF to ON, or from ON to OFF) as the valve mechanism 16 ceases to make contact with one of the microswitches 20 or 22, and at least one of the lights will change state as the valve mechanism 16 makes contact with the other microswitches 20 or 22. In other words, at least one light changes state at the beginning of the stroke travel, and at least one light changes state at the end of the stroke travel.

Because of the direct gearing between the valve mechanism 16 and the motor 26, there is a fixed number of motor revolutions involved in moving the valve mechanism 16 from one extreme of the stroke travel to the other extreme. The average RPM of the motor times the time it takes to travel this distance (which is the "stroke time" or the time between one light changing state to the other light changing state) will yield a fixed number of revolutions. If the stroke time is represented as T, then in general it can be said that $$RPM \times T = constant.$$

Therefore, for two different stroke times, T1 and T2, it can be shown than $$(T1) \times (RPM1) = (T2) \times (RPM2), \text{ or}$$

$$T1/T2 = RPM2/RPM1.$$

Figure 4:
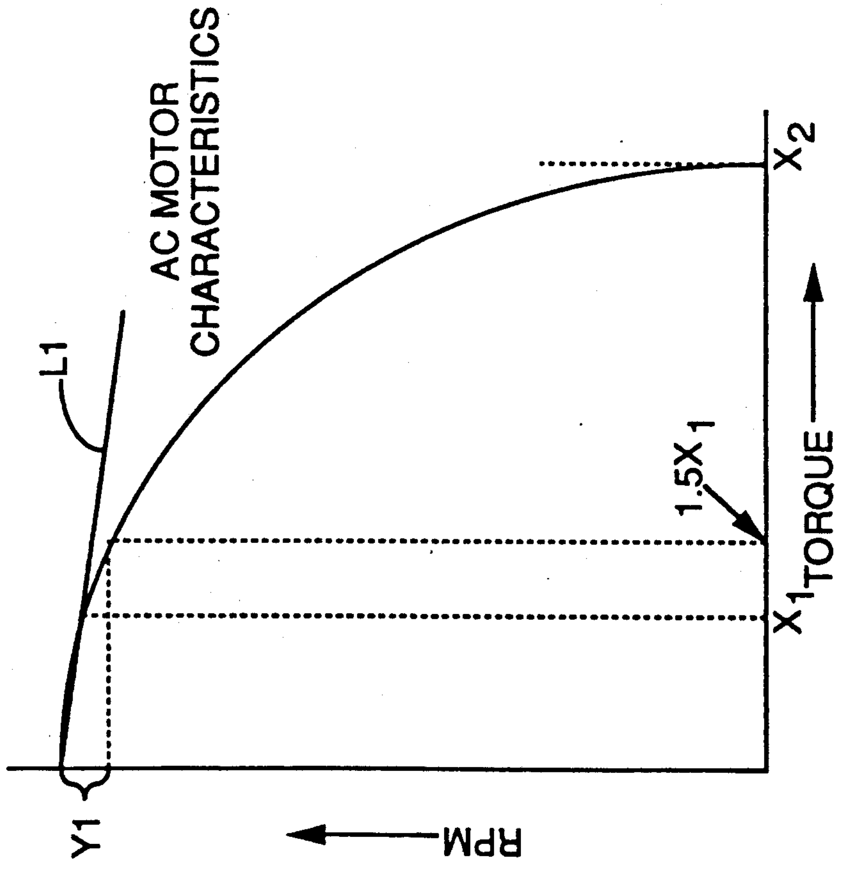
FIG. 4 is a graph illustrating a typical torque vs. rpm performance of an AC motor.

From this relationship, changes in stroke time can be used to determine relative changes in RPM, and thereby enable the use of the motor RPM vs. Torque curve to evaluate changes in motor torque requirements for the valve operation. Examples of using this approach are presented below in connection with FIGS. 4 and 5 for both an AC motor and a DC motor.

Figure 2:
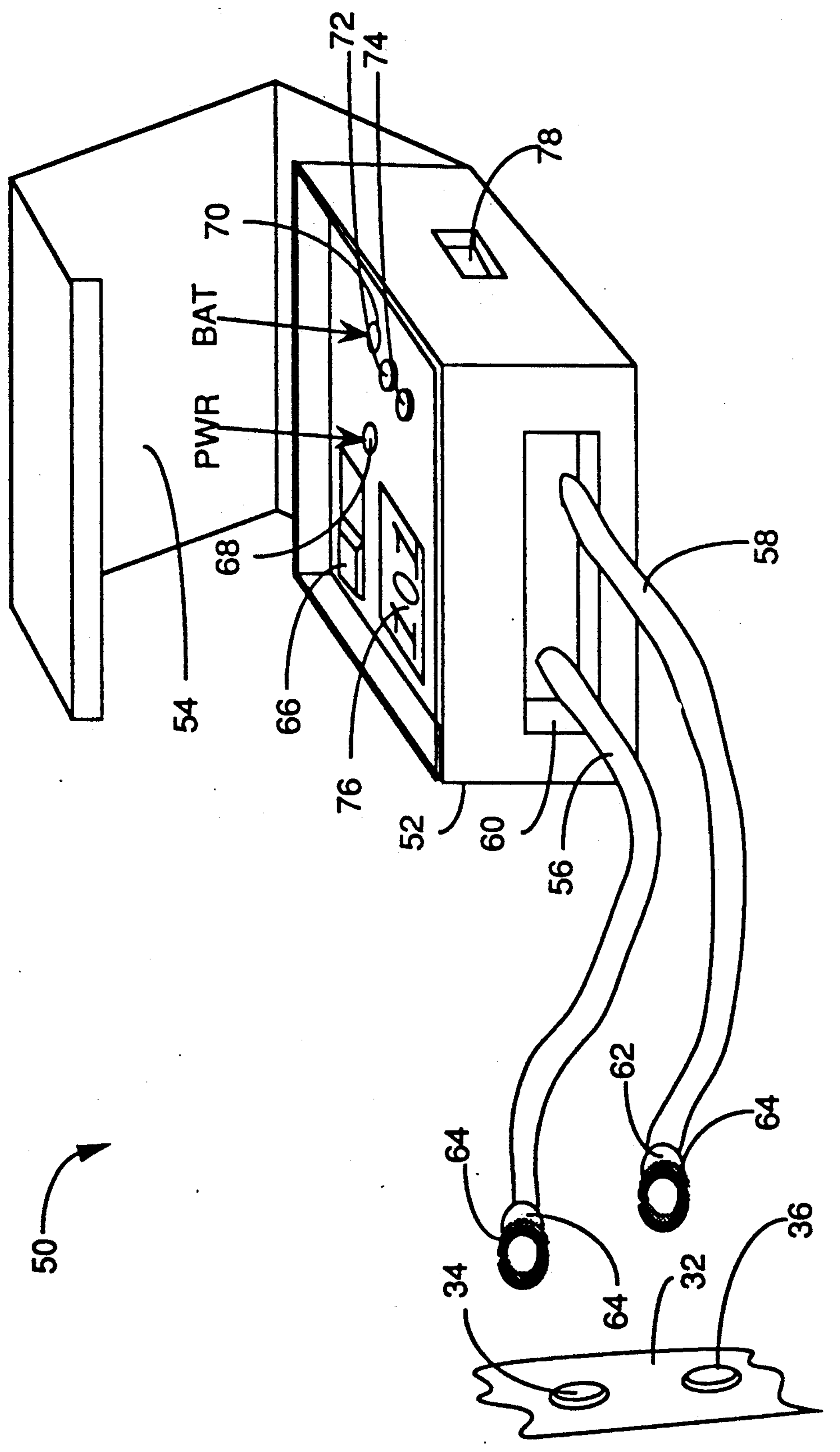
FIG. 2 is a perspective view of one embodiment of a hand-held evaluation unit made in accordance with the present invention.

Referring next to FIG. 2, a perspective view of a motor-operated valve evaluation unit 50 in accordance with one embodiment of the present invention is illustrated. The function of this device is to electro-optically measure the stroke time of a motor-operated valve 10 by measuring the time between detected changes in the indicator lights 34 and 36 of the motor-operated valve 10. As shown in FIG. 2, the unit 50 is preferably a small, portable, battery-powered device that is housed within a case 52. The case 52 may include a suitable cover 54 that allows the unit to be closed when not in use, and opened when in use. Two fiber optic cables 56 and 58 extend from a recess 60 within the case 52. When not in use, these cables 56 and 58, may be retracted within the recess 60 for storage. When in use, they are extended to make optical contact with the indicator lights 34 and 36 on the motor-operated valve control panel 32. Each cable 56 and 58 includes an opaque hood 62 at the end thereof adapted to cover one of the indicator lights 34 or 36, which indicator lights may have a dome-shaped lens. Preferably, an annular magnet 64, or a portion of an annular magnet, is included around the tip of the hood 62 to securely place the hood over the appropriate indicator light 34 or 36, and to hold it against the metal control panel 32 when a timing measurement is made. The hood 62 guides all the light from the appropriate indicator light 34 or 36, through the optical cable 56 or 58, to the circuits within the device 50, and also prevents outside ambient light from entering the cables 56 and 58. Alternatively, the cables 56 and 58 may be electrical cables, and an appropriate optical receiving device, such as the optical diodes and amplifier combinations described below, may be included within the hood 62.

A panel portion of the device 50, accessible only when the cover 54 is open, includes an ON/OFF switch 66, a power indicator light 68, a low battery indicator light 70, a reset button 72, a hold button 74, and a digital display 76. The function of these devices, if not self-evident, is described more fully below. An appropriate RS-232C connector port 78 may also be included optionally in a microprocessor embodiment of the invention as described more fully below in connection with FIG. 6.

Figure 3:
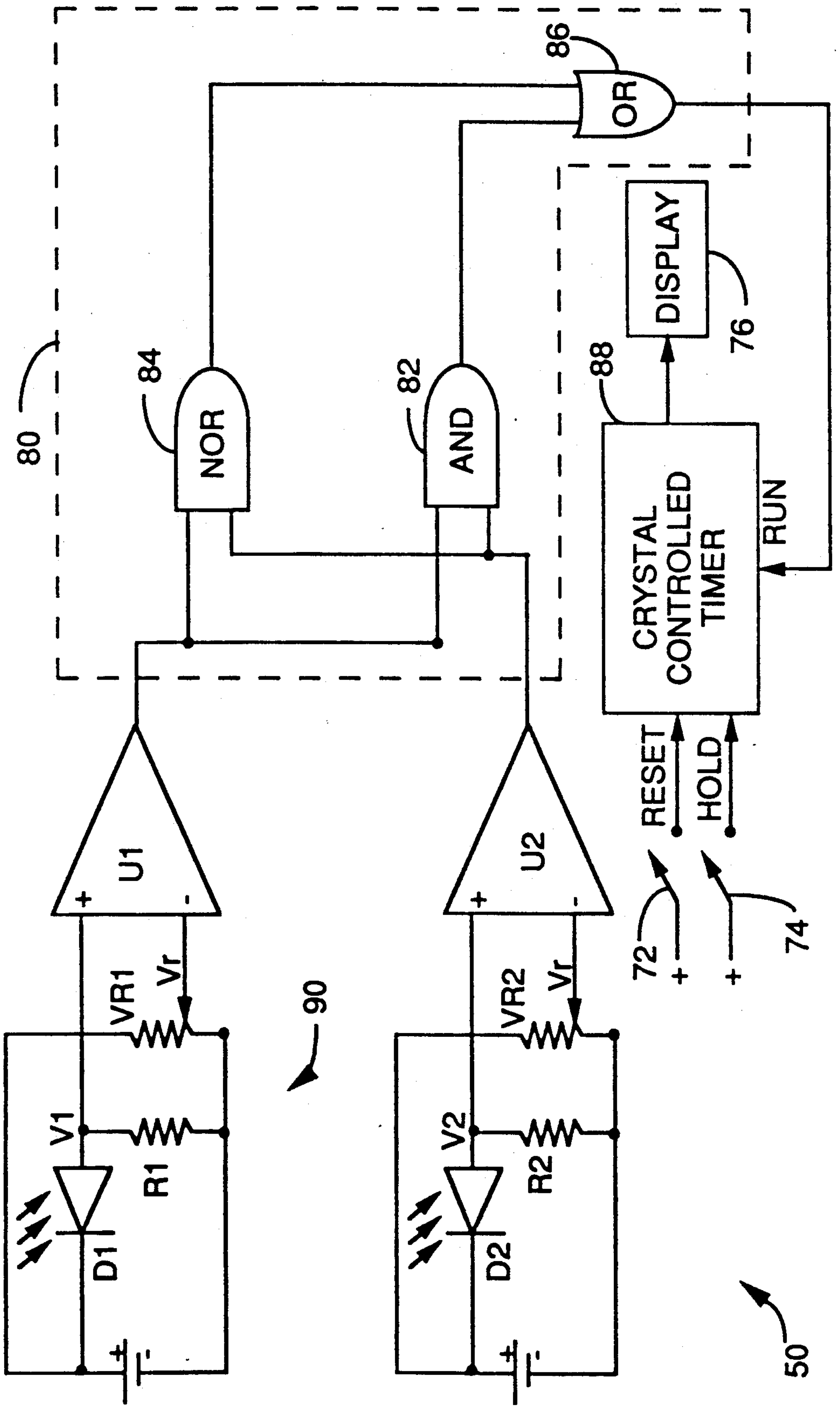
FIG. 3 is an electrical block diagram of one embodiment of the hand-held unit of FIG. 2.

Referring next to FIG. 3, the timer circuits within the evaluation unit 50 will be described. Two sensing channels are employed, one for each indicator light that is monitored. The operation of both channels is identical. In a first channel, a first photoconductive diode D1 is connected in a loop with a resistor R1 and a battery B1 so as to be reverse-biased. A variable resistor VR1 is connected in a second loop with battery B1 so that the wiper of the variable resistor provides an adjustable voltage level Vr. The junction between the resistor R1 and the cathode of diode D1, labeled V1 in FIG. 3, is connected to one of the input terminals of an amplifier U1. The wiper of the variable resistor VR1 is connected to the other input terminal of the amplifier U1. With no light impinging upon the diode D1, the voltage V1 is less than the voltage Vr, and the output of amplifier U1 assumes a high or low level (saturated output), depending upon the polarity of the input terminals. However, as soon as light is received by photodiode D1, it begins to conduct, thereby increasing the voltage V1 above Vr, and causing the output of amplifier U1 to assume the opposite level that it had prior to receipt of the light. In this manner, the output of amplifier U1 switches from one level to another depending upon whether light is received by the photodiode D1 or not.

The second channel of the timer circuit of FIG. 3 operates in the same manner as the first channel described above, with the output of amplifier U2 switching between one level and another level (saturated high or low) depending upon whether light is received by photodiode D2. As was indicated in FIG. 2, light is directed from the indicator lights 34 and 36 on the control panel 32 to the diodes D1 and D2 through optical fiber cables 56 and 58.

The output signals from amplifiers U1 and U2 are logically combined in a logic circuit 80 that functionally includes an AND gate 82, a NOR gate 84, and an OR gate 86. The AND gate 82 and the NOR gate 84 are essentially connected in parallel, with the output signals from both amplifiers U1 and U2 being applied to the respective inputs of both gates. The output signals from the AND gate 82 and the NOR gate 84 are connected to the respective inputs of the OR gate 86. The output of OR gate 86 is connected to the "run" terminal of a crystal controlled timer 88. Essentially, the timer 88 measures the time during which the signal at the "run" terminal is held at a first level, and stops such measurement as soon as the "run" signal assumes a second level. A transition of the run signal from the second level to the first level may thus be considered as a first trigger signal that starts the timer; while a transition from the first level back to the second level may be considered as a second trigger signal that stops the timer.

As is known in the art, time measurements are made in a timer circuit, such as the timer circuit 88, by counting the number of clock cycles in a stable (e.g., crystal controlled) clock signal, each cycle representing a fixed known increment of time, such as 1 millisecond. These cycles are counted in a conventional register circuit for as long as the run signal is held in its enabling state. As soon as the run signal switches to its disabling state, the counting of the clock signal stops, and the count held in the register represents the total time elapsed while the run signal was in its enabling state. This time interval may be transferred to the display device 76, where it is displayed to a desired level of accuracy. If a 1-millisecond clock is used, for example, the measurement may be displayed to the nearest millisecond, or 1/1000 of a second. A reset signal may be manually generated with the reset button 72 and applied to the timer circuit 88 in order to reset its register to zero, thereby enabling a new measurement to be made. Similarly, a hold signal may be manually generated with the hold button 74 and applied to the timer circuit 88 in order to hold the contents of its timing register at its existing value and prevent further timing measurements from being made until the reset button 72 is pressed.

In operation, at the end of any valve stroke, one of the indicator lights 34 or 36, will be ON, and the other indicator light 34 or 36, will be OFF. Therefore, the outputs of amplifiers U1 and U2 will be dissimilar. Since the AND gate 82 and the NOR gate 84 require both inputs to be the same in order for a signal to pass through, no output will be applied to the OR gate 86, and the timer 88 will not run. As soon as the valve stroke commences, however, one of the lights will change states (go from OFF to ON, or from ON to OFF) as the microswitch 20 or 22 (FIG. 1) at the end of the stroke position is deactivated by movement of the valve mechanism 16. This causes the outputs of amplifiers U1 and U2 to be the same, causing a signal to pass through either the AND gate 82 or the NOR gate 84, to the OR gate 86, and on to the "run" terminal of the timer 88, which starts the timer 88 running. At the end of the stroke travel, the other microswitch 20 or 22 is activated, causing its corresponding indicator light 34 or 36, to change states, thereby again forcing the output signal levels of amplifiers U1 and U2 to be dissimilar. This again blocks any signals from passing through the logic circuitry 80 (AND gate 82, or NOR gate 84, and OR gate 86), thus stopping the timer 88. The frequency count held in the timer 88 at the time it is stopped is displayed in the display 76, providing an accurate measurement of the stroke time.

On first use of the timing apparatus 50, it is anticipated that the voltage level Vr for each channel will need a one-time adjustment in the field based upon indicating light 34, 36 brightness and possible interference from room background lighting. Under normal operating conditions, interference from background lighting should be kept to insignificant levels if the hoods 62 are securely fastened around the indicator lights. After adjustment for light levels, a technician places the sensing elements and hoods 62 over the valve indicating lights 34, 36, turns on the timer 88 with the ON switch 66 (FIG. 2) and resets the display with the reset button 72, as necessary. The valve 12 is then stroked in either direction. The unit 50 automatically starts its timing operation at the first light change and stops its timing operation at the second light change. At the end of the valve stroke, the stroke time can be recorded, the display 76 reset, and the return stroke accomplished. The return stroke time will also be automatically measured without changing the sensor locations.

Advantageously, all of the components used in the timing apparatus 50 (FIG. 3) are commercially available components The timer 88 is based on a crystal controlled microcircuit that drives a standard, 5 digit, liquid crystal display, of the type commonly used in clocks and wristwatches. The preferred display reads in 1/100 second increments up to 200 seconds. Power is provided by a standard nine-volt battery. The photodiodes D1 and D2, are also commercially available components. The logic gates 82, 84, and 86, are also conventional logic gates, preferably CMOS gates, that require little operating power.

To some extent, the overall accuracy and repeatability of the timing apparatus 50 depends on the nature of the response of the light being coupled to the photodiodes D1 and D2, or equivalent light sensitive elements. While the timing apparatus can be adjusted to work with any type of indicating lamp 34, 36, the circuit shown in FIG. 3 is designed primarily for use with incandescent bulbs of the type commonly used in industrial instrumentation panels. Unfortunately, the light intensity of incandescent bulbs has a rise and decay time, due to the heating and cooling of the bulb, respectively, that may affect the triggering time of the timer circuit 50. If increased accuracy of the timing circuit is desired, the analog portions of the timing channels may be modified.

Some examples will next be presented of how the "RPM vs. Torque" curve for a motor-operated valve 10 may be used to help evaluate the operability of the valve 12. As previously indicated, a slowing down of the stroke time from one valve stroke to the next results from valve or operator degradations that cause increased loads on the motor 26. Motor 26 degradations can also cause a slowed stroke time. In order to analyze the stroke timing data to evaluate the magnitude and significance of the stroke time changes that are occurring, a baseline stroke time is initially established, and subsequent changes are analyzed as a change or percent change in RPM from the baseline. To illustrate, reference is first made to FIG. 4, where a typical "RPM vs. Torque" curve for an AC motor is illustrated. The torque at rated running conditions for a typical motor duty cycle is shown as X1. The maximum usable torque, such as for final valve seating, is shown as X2, and is typically five times X1. Typical running torques during testing are equal to X1 or less; hence, the RPM range of interest for stroke time testing corresponds to this torque range, i.e., RPM values within the range Y1. In this range and up to approximately 1.5 X1, a fair approximation of the motor characteristic can be represented by a straight line L1 drawn through the RPM point at 0 torque and the RPM corresponding to X1. Using this linear approximation simplifies the data analysis. Of course, other models such as a tangent line through the point at which the torque equals X1 may also be used.

With the linear model described, increased motor torque is determined from the stroke time changes as described below. The amount of increased torque that is permitted before additional maintenance or corrective action should be taken is a matter of judgment. However, for purposes of this example, assume it is desirable to detect a torque increase of approximately 50% of X1. (This amounts to 1/10 of the maximum torque, X2, and appears to be a reasonable goal.) The line L1 is drawn as described above and as shown in FIG. 4. The slope is determined from the curve in RPM per unit of torque. (This value is determined and documented for each valve motor operator.) Assume a typical slope value for purposes of this example, of a 4% RPM change for a torque change from 0 to X1. According to this linear model to detect a torque increase of 50% of X1, a 2% change in RPM is all that is allowable. From the time/RPM relationship developed previously, this corresponds to a stroke time increase of just 2%. Thus, for a motor-operated valve having a baseline stroke time of 15.0 seconds, which is typical for many motor-operated valves, an increase in the stroke time of just 300 milliseconds, from 15.0 seconds to 15.3 seconds, should serve as an alert point that corrective action may be required.

Figure 5:
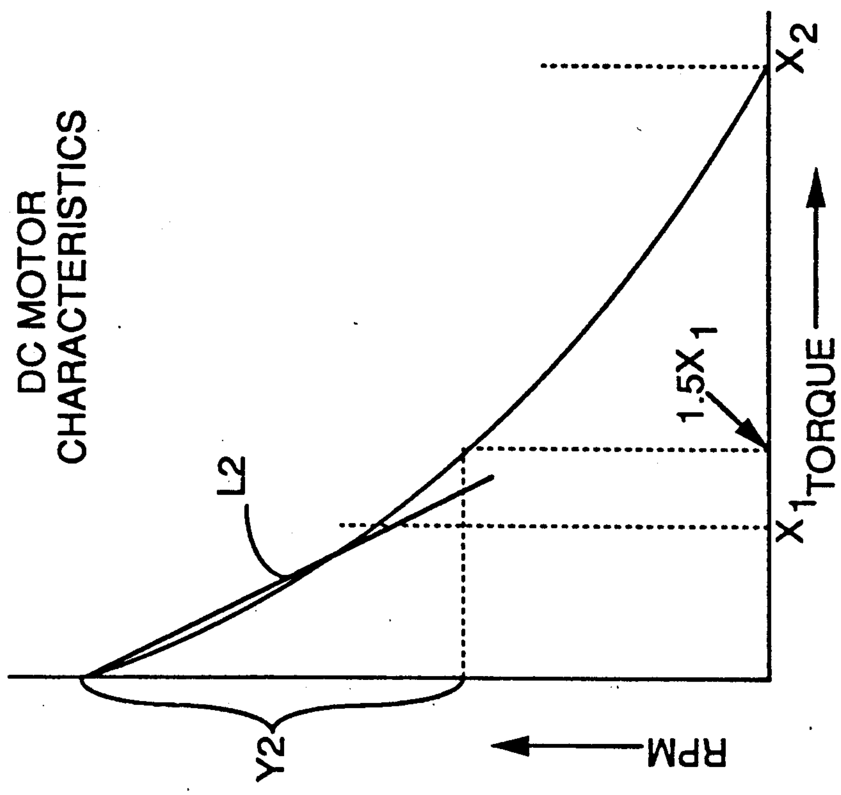
FIG. 5 is a graph illustrating a typical torque vs. rpm performance of a DC motor.

FIG. 5 illustrates a typical RPM vs. Torque curve for a DC motor. This curve is marked similarly to the curve of FIG. 4, except that the line that approximates the motor characteristics in the RPM range of interest, marked Y2, is marked L2. The stroke time analysis and evaluation is the same as for the AC motor-operated valve 10; however, as is evident from the general shape of the curve, the stroke time magnitudes to be evaluated are much greater because of the larger changes in RPM for a given torque change.

As is evident from the description of the invention presented thus far, the advantages of the invention over current practice are many. First, the timer 50 and timing technique have the accuracy and repeatability necessary to detect small stroke time changes, which may represent a significant change in motor torque, as is evident from the AC motor example presented above. Second, the analysis and evaluation technique used by the present invention can advantageously utilize the more accurate data to provide an early warning of motor-operated valve degradation, thereby permitting appropriate maintenance or corrective action to be taken before a serious malfunction develops. Third, the present invention retains the advantages over more comprehensive tests in its ease of performance. It requires no activity other than an equipment technician stroking the valve while using the timer, and requires no intrusion of the tested equipment. Still greater advantages are provided by the microprocessor embodiment of the invention, described next in connection with FIGS. 6–8.

Figure 6:
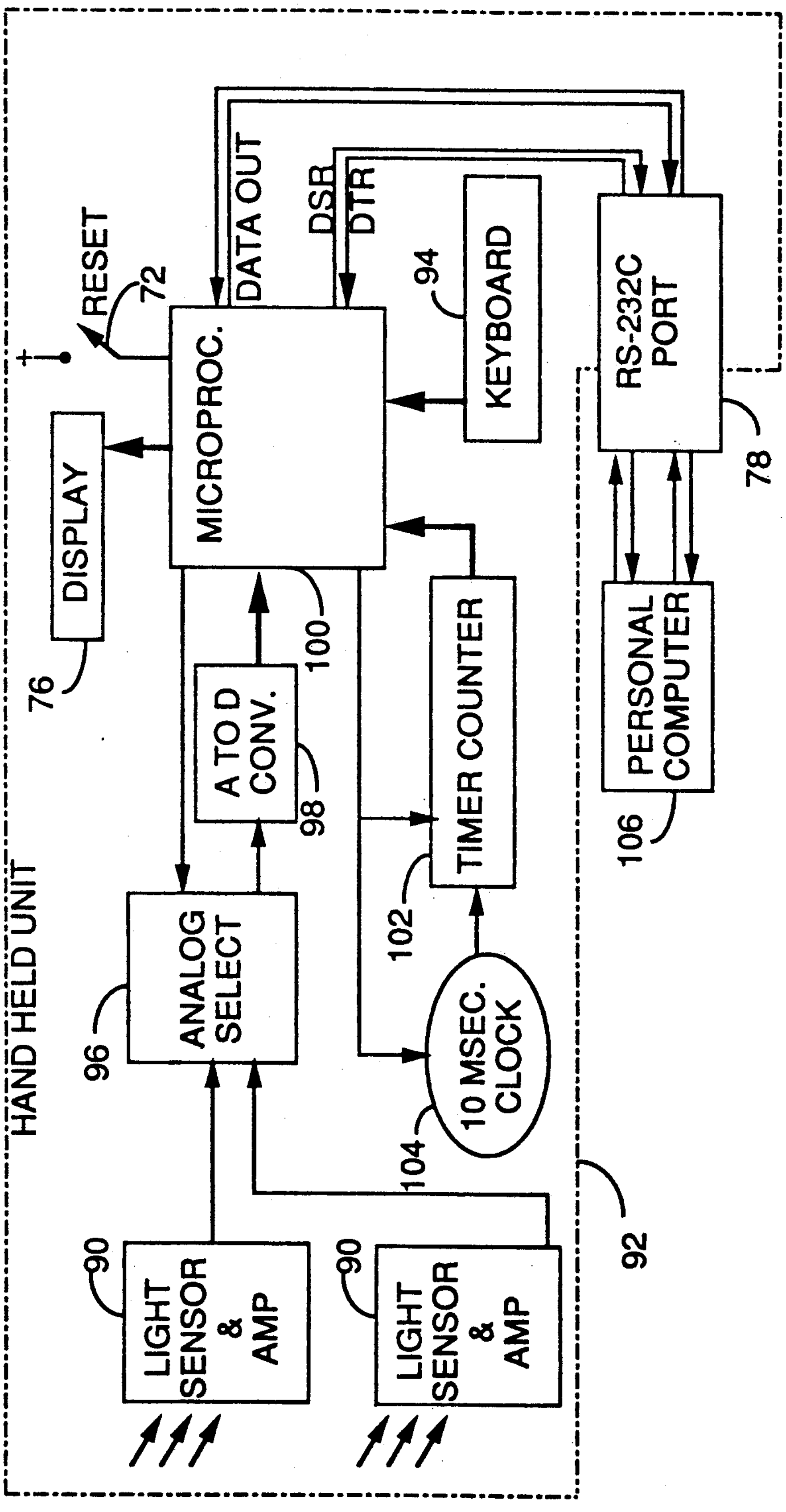
FIG. 6 is a block diagram of a microprocessor-based embodiment of the hand-held unit of FIG. 2.

Referring to FIG. 6, a block diagram of a microprocessor embodiment of a hand-held timing apparatus 92 made in accordance with the present invention is illustrated. The apparatus 92 is housed in a suitable case, similar to the case 52 shown in FIG. 2, but with many of the buttons and switches shown in FIG. 2 being replaced with a simple keyboard 94. Means are provided, as shown in FIG. 2, for optically coupling to the indicator lights 34, 36 of the particular motor-operated valve 10 being evaluated. Each of these optical coupling means direct the light to respective light sensors and amplifiers 90, which may be of the same type previously described in FIG. 3. An analog select circuit 96 selectively directs the analog output signals from the light sensors 90 to an Analog-to-Digital (A/D) converter 98. From there, these signals are coupled to a microprocessor 100, where the signals are processed in the manner described below in connection with FIG. 7. Included in the microprocessor 100 are suitable memory devices, such as ROM (read only memory) and EEPROM (electronically erasable programmable read only memory) chips. The controlling operating program for the microprocessor 100 may be stored in the ROM. Timing data may be stored in EEPROM. A timer counter 102, and a 1 millisecond clock 104, combine to provide the same time measurement function performed by the crystal controlled timer 88 of FIG. 3. In fact, the timer counter 102 and clock 104 may be the same as the crystal controlled timer 88 of FIG. 3.

Also included in the microprocessor-based hand-held unit 92 is an RS-232C port 78. Such a port provides serial communication between the on-board microprocessor 100 and an external central processing unit (CPU) 106, such as a personal computer. The RS-232C serial interface is well defined in the art, and provides an effective and reliable technique for transferring data between the microprocessor 100 and the external CPU 106.

Advantageously, all of the components used within the hand held unit 92 of FIG. 6 may be commercially available components, the specifications and manner of use of which are well documented in the art. In a preferred mode, for example, the microprocessor is an XC68HC811A2FN device manufactured by Motorola. This device advantageously includes a built-in A/D converter which can function as the A/D 98 shown in FIG. 6. Other components included in FIG. 7 may be as described elsewhere herein, or equivalents thereof. The personal computer, and associated peripheral equipment (considered as part of the personal computer), may be any IBM compatible system, Apple system, or other system adapted to receive and send serial communications through an RS-232C port. As with the embodiment described in connection with FIGS. 2 and 3, the hand-held unit 92 is small, battery-powered, and readily transportable, much as are many "lap top" computers currently available in the market place.

Figure 7:
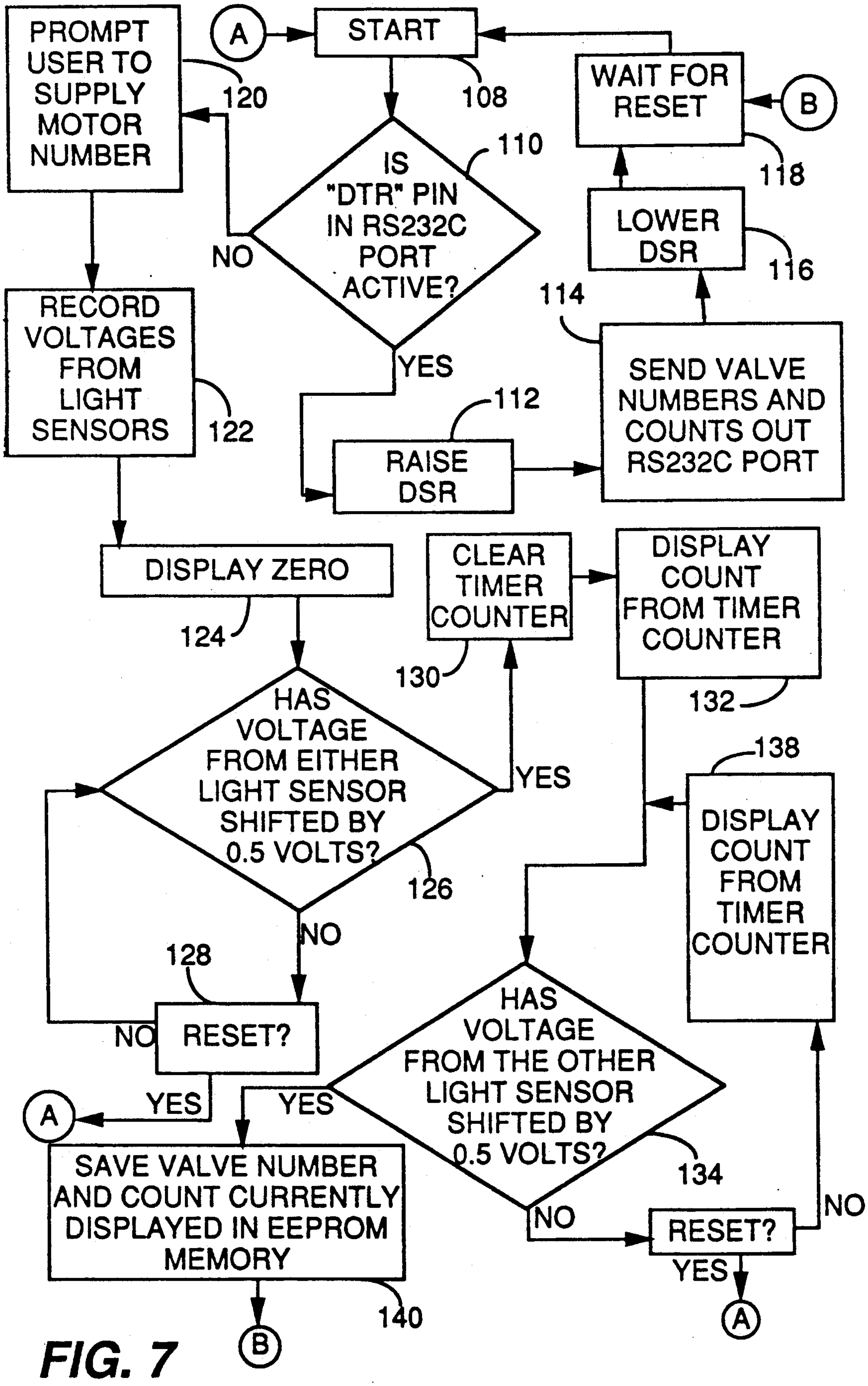
FIG. 7 is a flow chart of the software used to control the microprocessor within the hand-held unit of FIG. 6.

The manner of operating the hand held unit 92 of FIG. 6 is illustrated in the flow chart of FIG. 7. At the outset, it is important to understand, as do those skilled in the art, that a microprocessor is essentially a cycle-based machine that executes a set of instructions as controlled by a system clock. The system clock may be quite fast, compared to the events being controlled by the device. For example, the clock speed may be on the order of 4–8 Mhz, which means a given clock cycle is only, at most, 250 nsec long. While a given instruction may take one or more clock cycles to complete, there are still many instructions that can be performed in a relatively short time, e.g., 10–20 microseconds. The basic instructions carried out by the system may be represented in a flow chart, such as FIG. 7. Each "block" in the flow chart typically requires many machine-level instructions to complete. Sometimes, an entire subroutine is required to execute the function specified in a block. However, execution of each block occurs very rapidly compared to the measurement times of interest. The flow chart of FIG. 7 is considered to be a high level flow chart, in that many machine-level instructions are required to perform the functions specified in each block of the flow chart. However, the level of detail provided in FIG. 7 is believed to be adequate to enable one skilled in the art to program a microprocessor-based system, such as that shown in FIG. 6, to perform the indicated steps.

Figure 8:
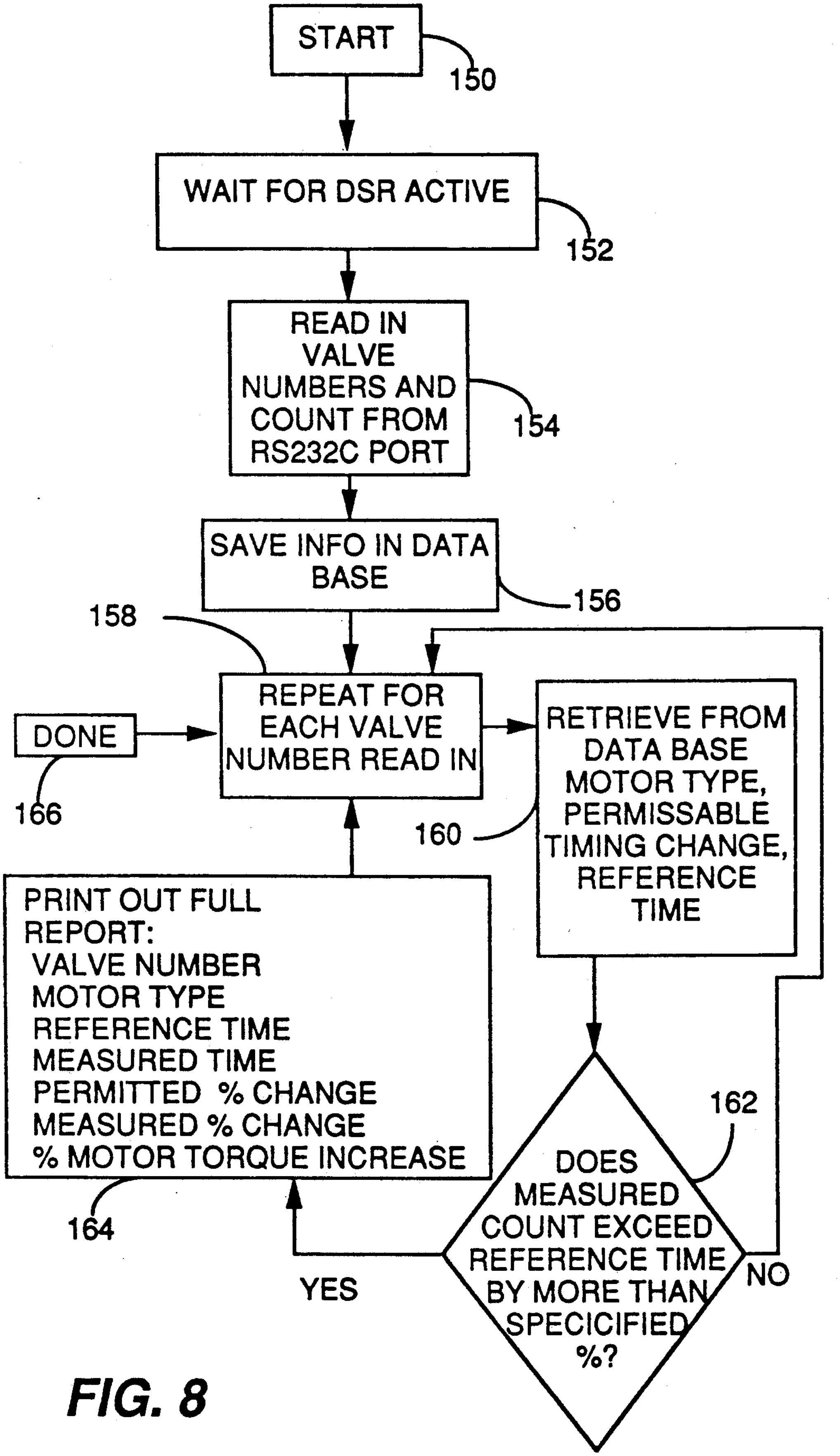
FIG. 8 is a flow chart of the software used in the personal computer that is linked to the hand-held unit of FIG. 6.

Referring to the flow chart of FIG. 7, it is seen that starting the device is initiated by providing a reset signal at Block 108. Then the microprocessor 100 determines in Block 110 whether the "DTR" terminal (data terminal ready) of the RS-232C port is active. If so, then the CPU 106 is waiting to receive previously stored data. Such data is sent by raising the "DSR" (data set ready) terminal at Block 112, which signals the CPU that the data is ready to send. Consequently, valve identification numbers and the corresponding counts (corresponding to stroke times), stored in the EEPROM of the microprocessor 100, are transferred out the RS-232C port 78 to the CPU 106 at Block 114. From this data, the CPU 106 generates desired reports as illustrated in FIG. 8. After the data is sent, the "DSR" terminal is lowered at Block 116, and the system waits for a reset signal in Block 118, which reset signal is manually provided by the reset button 72. Alternatively, a reset signal may be generated automatically after a prescribed waiting period has timed out.

If the "DTR" pin is not active at Block 110, then in Block 120 the microprocessor 100 prompts the user to supply the motor identification number of the motor that is being evaluated. The user supplies this number through the keyboard 94. The microprocessor 100 then records (stores in a holding register) first one, and then the other, of the voltages obtained from the sensors 90 at Block 122, which voltages are made available to the microprocessor 100 through the analog select circuit 96 and the A/D converter 98. The difference between the time one sensor is measured and the time that the next sensor is measured is only on the order of a few microseconds, so this time difference is negligible for purposes of the present invention, and it is as though the output voltage from both sensors were measured simultaneously. The display is next zeroed at Block 124, thereby indicating to the user that a timing measurement may now be made. The user then strokes the valve being tested, while the processor continuously monitors the voltages obtained from each sensor to determine if any have shifted by a prescribed amount at Block 126. In FIG. 7, this prescribed amount is indicated as 0.5 volts, but it is to be understood that any desired amount could be used as a threshold. If not, then the system next determines whether are set signal has been received at Block 128, and if so, the system returns to the start of its operation at Block 108. If the voltage from either sensor has shifted by more than the prescribed amount at Block 126, then the timer counter 102 is cleared in Block 130, thereby enabling a time measurement to begin. While the time measurement is in progress, the count from the timer counter 102 is displayed in the display 76 at Block 132. During each instruction cycle, the microprocessor 100 monitors the sensor voltages 90 to determine if either sensor 90 has changed by the prescribed threshold amount at Block 134. If not, the system determines if a reset signal has been generated at Block 136, and if not, the display 76 is updated with the then-existing count from the timer counter 102 at Block 138, after which the sensors 90 are again checked to determine if the voltage level from either one has changed more than the threshold amount in Block 134. This process continues until the voltage level from one of the sensors 90 does shift by the prescribed amount, indicating that the stroke distance of the valve 12 has been traversed, and that the then existing count held in the display is the "stroke time" that is to be measured. This stroke time value, along with the identification number of the valve 12 on which the stroke time measurement was made, is stored in the EEPROM memory in Block 140, after which the system waits for the next reset signal at Block 118.

Referring next to FIG. 8, a flowchart for the basic software program utilized in the CPU 106 to process the data received from the microprocessor 100 is illustrated. Upon starting the program at Block 150, the system progresses to Block 152 and looks for a "DSR" (data set ready) active signal on the DSR terminal of the RS-232C serial port. As soon as the DSR terminal is active, then the data from the microprocessor EEPROM, including the valve numbers and corresponding stroke time counts, are read into the active memory of the CPU at Block 154. This data is then saved in an appropriate data base file in Block 156, and the process is repeated for each valve 12 for which data exists at Block 158.

With the data from each valve stored in a suitable data base file, the data may be processed and analyzed in a desired manner in order to determine if any problems may be indicated. Advantageously, numerous commercially available data base management programs, such as DBASE II, QUATTRO, or PARADOX, could utilize this data base file and be programmed as desired in order to perform the necessary steps for the comparative type analysis performed by the method of the present invention. For example, to begin such an analysis, the identifying data and performance criteria parameters, previously recorded in the data base file (motor type, permissible timing changes, baseline stroke time data, and the like) are retrieved from the data base file in Block 160. A quantitative analysis is then performed to determine if the measured stroke times exceed the reference time by more than a prescribed percentage at Block 162. If not, then the next set of data for the next valve is retrieved in Block 158 and the process is repeated. If the stroke time exceeds the reference time by a prescribed percentage, then a full report is printed out that identifies the valve number, the motor type, the baseline (reference) stroke time, the measured stroke time, the permitted percent change in stroke time, the measured percent error, and the percent increase in motor torque at Block 164. Other data, as desired, may also be included in the report. Once the report is printed, the next set of data is retrieved at Block 158, and the process is repeated. If there are no more data sets, then the program terminates at Block 166.

Advantageously, the commercially available data base programs that currently exist, such as those referenced above, provide sufficient flexibility in their use to allow much more comprehensive data and reports than those identified above to be generated. For example, histogram data that depicts the number of valves of a given type having stroke times that fall into specified ranges can be easily accumulated and printed in a graph. Such data is useful to depict trends that may be developing with one of more of the motor-controlled valves. Other statistical analyses of the data can also be performed, as desired.

While the invention herein disclosed has been described by means of specific embodiments and applications thereof, numerous modifications and variations could be made thereto by those skilled in the art without departing from the spirit and scope thereof. Accordingly, it is therefore to be understood that within the scope of the appended claims, the invention may be practiced otherwise than as specifically described herein.

What is claimed is:

1. Apparatus for evaluating a performance of a motor-operated valve, said valve assuming a first or a second state as controlled by an operator, said valve including first and second visual indicator means mounted upon an operator's panel for indicating its status as it switches from one said state to the other said state, each of said first and second indicator means providing a respective status signal that changes condition, such as from OFF to ON and from ON to OFF, as said switching device switches states, either one of said first and second indicator means changing its condition as said valve begins its change of state, and the other of said first and second indicator means changing its condition as said valve concludes its change of state, said apparatus comprising:

sensing means for sensing any change in condition of either of said indicator means when positioned proximate therewith;

logic means coupled to said sensing means for generating a first trigger signal coincident with a change in condition of either of said indicator means, and a second trigger signal coincident with a change in condition of the other of said indicator means, whereby said first trigger signal is generated as said switching device begins its change of state, and said second trigger signal is generated as said switching device ends its change of state, said first and second trigger signals defining a time period beginning synchronously with said first trigger signal and ending synchronously with said second trigger signal;

timing means coupled to said logic means for measuring and displaying the time period between said first trigger signal and said second trigger signal, said time period representing a time duration required for said switching device to change states;

said measured time period providing an indication of the performance of said valve;

said apparatus being portable for convenient relocation to different visual indicator means corresponding to different valves; and data conversion means including stored motor speed to torque conversion data for converting said time duration into torque or thrust data indicative of the thrust opposing rotation of the motor.

2. The apparatus of claim 1 wherein said sensing means comprises first and second sensor means each generating a continuously varying signal, and wherein said logic means comprises:

amplifier means respectively coupled to said first and second sensing means to receive said continuously varying signal for generating a respective output signal that changes levels whenever the condition of the sensing means changes by a prescribed amount; and means for processing the output signal from each of the respective amplifier means to generate said first and second trigger signals only when the output signal level has changed a prescribed amount.

3. The apparatus of claim 1 wherein said sensing means, logic means, and timing means are all housed in a portable hand-held case, said hand-held case including battery means for providing operating power to said apparatus.

4. The apparatus of claim 1 wherein said sensing means comprises first and second means each generating a continuously varying signal, and wherein said logic means comprises:

first and second signal amplifier means respectively coupled to said first and second sensing means to receive said continuously varying signal for generating a respective output signal that changes levels whenever the signal of the corresponding sensing means changes by a prescribed amount; and logic circuitry connected to receive the output signals of each amplifier means, said logic circuitry combining the respective output signals from said amplifier means in a way that produces said first and second trigger signals whenever either output signal changes level; in either direction.

5. The apparatus of claim 4 wherein said logic circuitry produces a single output trigger signal that changes signal level in one direction to indicate said first trigger signal, and that changes signal level in the other direction to indicate said second trigger signal.

6. The apparatus of claim 1 wherein said sensing means comprises first and second sensor means each generating a continuously varying signal, and wherein said logic means comprises:

amplifier means respectively coupled to said first and second sensing means to receive said continuously varying signal for generating a respective output signal that changes levels whenever the condition of the sensing means changes by a prescribed amount; and microprocessor circuit means for receiving the respective output signals from said amplifier means and processing said signals to produce said first and second trigger signals whenever either output signal changes level in either direction.

7. The apparatus of claim 6 further including a central processing unit, wherein said microprocessor circuit includes a communication port through which data can be transferred to and from said central processing unit, said central processing unit having programming means therein for using data provided by said microprocessor circuit to generate reports containing data useful in the evaluation of said switching device.

8. The apparatus of claim 1 wherein said timing means comprises:

a timer circuit that measures the elapsed time between said first and second trigger signals as a function of a reference clock signal; and a display device connected to said timer circuit that displays the elapsed time measured by said timer circuit as a digital number expressed in a specified measure of time to a specified tolerance.

9. The apparatus of claim 8 wherein said timer circuit further includes manual reset means for manually resetting the elapsed time measurement to zero, whereby a new elapsed time measurement can be made; and means for manually holding the elapsed time measurement in said display device until said timer circuit is manually reset.

10. The apparatus of claim 1 wherein said first and second indicator means of said switching device comprise first and second indicator lights one of which is turned ON to indicate one condition and the other of which is turned ON to indicate the other condition, and wherein said sensing means comprises respective electro-optical sensing means for sensing the condition of said first and second indicator lights.

11. The apparatus of claim 10 wherein said coupling between said logic means and said sensing means comprises electrical cable means for coupling the electro-optical sensing means to said logic means, said electro-optical sensing means being positioned proximate to said first and second indicator lights.

12. The apparatus of claim 10 further including optical fiber cable means for respectively coupling the electro-optical sensing means to said first and second indicator lights.

13. The apparatus of claim 12 further including attachment means for detachably securing the coupling between said optical fiber cable means and said first and second indicator lights.

14. The apparatus of claim 13 wherein said attachment means comprises a hood attached to the end of said optical fiber cable means, said hood having magnet means located therein for securely holding said hood against a metal object, whereby said hood can be detachably secured over indicator lights mounted in a metal panel.

15. Apparatus for evaluating the performance of motor-operated valves by measuring a transient event's time duration, said transient event being defined by a change in state of two indicator lights which indicate the stroke time of a motor operated valve and which are mounted upon a control panel, said two indicator lights changing state in sequence as said transient event occurs, either one of said two indicator lights changing state first at the start of the transient event, and the other of said two indicator lights change state second at the conclusion of the transient event, said first and second state changes defining end points in time of said transient event, said apparatus comprising:

sensing means for sensing any change in state of either of said indicator lights when positioned proximate therewith;

logic means coupled to said sensing means for generating a first trigger signal coincident with a change of state of either of said indicator lights, and a second trigger signal coincident with a change in state of the other of said indicator lights, whereby said first and second trigger signals are generated coincident with the start and conclusion of the transient event;

timing means coupled to said logic means for measuring the time period between said first trigger signal and said second trigger signal, said time period comprising the time duration of the transient event;

said apparatus being portable for convenient relocation to different indicator lights corresponding to different valves; and conversion means including motor torque and speed characteristics for converting said time period into data indicating the torque load upon the motor operating the valve.

16. The apparatus of claim 15 wherein said timing means includes means for displaying the measured stroke time, said measured stroke time providing an indication as to the amount of torque required for said motor-operated valve to change from an open position to a closed position, or from a closed position to an open position, and including means to compare said torque load indicating data to an anticipated torque load to provide an indication as to whether said motor-operated valve's performance has degraded to where maintenance or replacement of said motor-operated valve is needed.

17. A method for measuring the stroke time of a motor-operated valve with a portable timing clock, said timing clock including display means for displaying an elapsed time between a start signal and a stop signal applied thereto, the stroke time's end points being marked by a change in two visible indicator means' condition, which visible indicator means are mounted upon a control panel, said method comprising the steps of:

(a) positioning the portable timing clock proximate to the visible indicator means for a valve and electronically monitoring the two visible indicator means for a change in state;

(b) electronically generating said start signal and applying it to said timing clock upon the first occurrence of a change of state in either of said indicator means;

(c) electronically generating said stop signal and applying it to said timing clock upon the occurrence of a change of state in the other of said indicator means;

(d) measuring the time that elapses between said start and stop signal using timing means within said timing clock and displaying said elapsed time on said display means, said elapsed time comprising the time duration of said stroke time; and (e) converting said stroke time into motor thrust or torque information which indicates directly how much force the motor is acting against when operating the valve.

18. The method of claim 17 wherein said indicator mans each comprise a light that assumes an ON or an OFF condition, and wherein the step of electronically monitoring said two indicator means comprises the steps of:

monitoring first said light with a first electro-optical detection circuit and generating a first trigger signal upon the sensing of a change in state of said first light; and monitoring second said light with a second electro-optical detection circuit and generating a second trigger signal upon the sensing of a change in state of said second light.

19. The method of claim 18 wherein the step of electronically generating said start signal comprises combining said first and second trigger signals in an OR gate, an output signal from said OR gate being generated coincident with the occurrence of either said first or second trigger signals, said OR gate output signal being applied to said timing clock as said start signal.

20. A method of evaluating an AC motor operated valve's performance, said valve assuming a first or a second state and having associated with each state a visible indicator mounted upon a control panel using a portable electronic timer having light sensing means for sensing incoming light, said method comprising the steps of:

(a) positioning said portable timer proximate to the visible indicators so that light from said indicator reaches said light sensing means and electronically measuring a time period required for the switching device to switch from one state to the other, as indicated by said visible indicators, with sufficient accuracy to reveal a change of approximately 2% in motor RPM;

(b) storing the time period measured in step (a) in a memory device;

(c) repeating steps (a) and (b) whenever it is desired to evaluate the performance of the switching device;

(d) comparing a time period measured in step (c) with at least one time period stored in step (b); and (e) identifying any significant increase in the most recently measured time period based on the comparison step (d) as an indication that the performance of the switching device is degrading, and that said switching device may need maintenance or replacement.

21. The method of claim 20 further including the step of converting the time period measurement into an indication of motor torque or thrust using pre-stored motor characteristic data.

22. The method of claim 20 further including determining a base-line time period for said switching device, said base-line time period comprising the time period required for a properly operating switching device to change from one state to the other, and storing said base-line time period in said memory device; and wherein step (d) includes comparing the most recently measured time period with the previously-stored base-line time period.

* * * * *

UNITED STATES PATENT AND TRADEMARK OFFICE
CERTIFICATE OF CORRECTION

PATENT NO. : 5,033,012

DATED : July 16, 1991

INVENTOR(S) : Peter R. Wohld

It is certified that error appears in the above-identified patent and that said Letters Patent is hereby corrected as shown below:

Col. 15, claim 4, line 42, after "level", delete the semicolon.

Col. 17, claim 18, line 58, change "mans" to --means--.

Signed and Sealed this

Sixteenth Day of March, 1993

*Attest:*

STEPHEN G. KUNIN

*Attesting Officer*

*Acting Commissioner of Patents and Trademarks*